United States Patent [19]
Kintaichi et al.

[11] Patent Number: 5,336,476
[45] Date of Patent: Aug. 9, 1994

[54] PROCESS FOR REMOVING NITROGEN OXIDES IN EXHAUST GASES TO NITROGEN

[75] Inventors: Yoshiaki Kintaichi; Hideaki Hamada; Takehiko Ito; Motoi Sasaki, all of Ibaraki; Mitsunori Tabata, Saitama; Kazushi Usui, Chiba, all of Japan

[73] Assignees: Agency of Industrial Science and Technology; Cosmo Research Institute, both of Tokyo, Japan

[21] Appl. No.: 967,578

[22] Filed: Oct. 27, 1992

Related U.S. Application Data

[63] Continuation of Ser. No. 705,405, May 24, 1991, abandoned.

[30] Foreign Application Priority Data

| May 28, 1990 | [JP] | Japan | 2-139340 |
| Aug. 1, 1990 | [JP] | Japan | 2-204102 |
| Aug. 1, 1990 | [JP] | Japan | 2-204103 |
| Aug. 1, 1990 | [JP] | Japan | 2-204104 |

[51] Int. Cl.$^5$ ............................................. B01D 53/36
[52] U.S. Cl. ................................. 423/239.1; 423/212; 423/213.7
[58] Field of Search ............. 423/239, 212, 213.2, 423/213.5, 213.7, 239.1

[56] References Cited

U.S. PATENT DOCUMENTS

| 3,741,725 | 6/1973 | Graham | 423/213.5 |
| 4,024,219 | 5/1977 | Takahashi et al. | 423/400 |
| 4,051,072 | 9/1977 | Bedford et al. | 423/213.5 |
| 4,157,375 | 6/1979 | Brown et al. | 423/239 |
| 4,745,095 | 5/1988 | Saito et al. | 502/78 |
| 4,935,393 | 6/1990 | Schwetje et al. | 502/65 |
| 4,954,476 | 9/1990 | Hums | 502/350 |
| 5,010,051 | 4/1991 | Rudy | 423/213.7 |
| 5,041,270 | 8/1991 | Fujitani et al. | 423/213.2 |
| 5,041,272 | 8/1991 | Tamura et al. | 423/239 |
| 5,208,205 | 5/1993 | Subramanian et al. | 423/213.5 |

FOREIGN PATENT DOCUMENTS

| 0135033 | 3/1985 | European Pat. Off. . |
| 0286967 | 10/1988 | European Pat. Off. . |
| 2239489 | 3/1973 | Fed. Rep. of Germany . |
| 3544998 | 2/1987 | Fed. Rep. of Germany . |
| 3642018 | 6/1987 | Fed. Rep. of Germany ... 423/213.2 |
| 63-198712 | 8/1988 | Japan .......... 423/239 |

OTHER PUBLICATIONS

Grant, R., et al. "Chemical Dictionary", 5th ed. McGraw Hill: New York (1990), p. 257.

*Primary Examiner*—Wayne Langel
*Assistant Examiner*—Peter T. DiMauro
*Attorney, Agent, or Firm*—Sughrue, Mion, Zinn, Macpeak & Seas

[57] ABSTRACT

A process for reducing nitrogen oxides to nitrogen from exhaust gases is disclosed, which involves bringing an exhaust gas containing nitrogen oxides into contact with at least one catalyst from proton-type zeolites, zeolites of an alkali metal exchanged form and acidic metal oxides, by reaction with a hydrocarbon or an oxygen-containing organic compound in an oxidizing atmosphere containing excess oxygen. A process which further involves bringing the exhaust gas into contact with an oxidizing catalyst subsequent to the above process.

12 Claims, No Drawings

PROCESS FOR REMOVING NITROGEN OXIDES IN EXHAUST GASES TO NITROGEN

This is a continuation of application Ser. No. 07/705,405 filed May 24, 1991, now abandoned.

FIELD OF THE INVENTION

The present invention relates to a process for reducing nitrogen oxides in exhaust gases to nitrogen. More particularly, the present invention relates to a process which comprises bringing a specific catalyst into contact with a gas containing nitrogen oxide in an oxidizing atmosphere with excess oxygen by reaction with a small amount of a hydrocarbon or an oxygen-containing organic compound which either may be added to or may be initially present in the exhaust gas as a residue.

BACKGROUND OF THE INVENTION

Nitrogen oxides (referred to hereinafter as "NOx") which are contained in various types of exhaust gas not only threaten the health of individuals but are in general environmentally undesirable, since they may cause acid rain or photochemical smog. Accordingly, the development of an effective means for exhaust gas treatment, specifically the development of an effective NOx abatement method, has been sought by those in the art.

Some processes for reducing the NOx content of exhaust gases using catalysts have been put into practice. As examples of such processes, there can be mentioned a ternary catalyst process for gas fueled automobiles and a selective catalytic reduction process using ammonia for exhaust gases which are discharged from heavy industrial installations comprising, for example, boilers.

JP-A-63-283727 and the like (the term "JP-A" as used herein signifies an "unexamined published Japanese patent application) describe a process for reducing NOx in exhaust gases to nitrogen, the exhaust gases containing hydrocarbons which comprises bringing the exhaust gases containing NOx into contact with a zeolite having dispersed therein various types of metals. Various metals have been added to such a zeolite, and the resulting product is utilized as the catalyst.

In the first process proposed above, i.e., in the ternary catalyst process, the hydrocarbon components and carbon monoxide initially present in the waste gas which is exhausted upon combustion of the fuel are converted to water and carbon dioxide with the aid of a catalyst while consuming the oxygen in the NOx to thereby reduce it to nitrogen. In this process, however, the combustion must be carefully controlled in that a stoichiometric amount of oxygen is supplied to the combustion system so that the oxygen content in the NOx compensates for the amount of oxygen consumed in the oxidation of the hydrocarbon components and the carbon monoxide. Thus, this process is, by principle, not applicable to combustion systems where excess oxygen is present, such as systems involving a diesel engine.

The second process, i.e., the selective catalytic reduction process using ammonia, requires a very large scale installation for the sake of safety, since the process handles toxic and inflammable ammonia under high pressure. Accordingly, the process is not applicable, from the technological viewpoint, to systems comprising movable exhaust gas sources.

The last process mentioned above, i.e., the process for removing NOx from a hydrocarbon-containing exhaust gas using a zeolite catalyst, is intended for application mainly to gas-fueled automobiles. Accordingly, the process is unsuitable for treating exhaust produced by combustion in a diesel engine. If the process were to be applied to diesel engines, the activity of the catalyst would be insufficient to achieve the desired level of NOx removal. In more detail, since metal components are present in the catalyst, the catalyst not only suffers degradation due to the sulfur oxides discharged from the diesel engine, but also loses activity due to aggregation or a like behavior of the metal components thereof. Thus, this process has not been put into practice for the removal of NOx from exhaust gases discharged from diesel engines.

In light of the above, the present inventors conducted intensive research to overcome the problems set forth above, and, as a result, found that the use of a particular catalyst removes the NOx components from exhaust gases at high efficiency without a loss of activity even in the presence of sulfur oxides. It was further found that this removal process can be conducted without producing harmful substances such as carbon monoxide. This is an aspect of the present invention which makes the process disclosed herein highly advantageous, since conventional processes frequently discharge such substances into the atmosphere, depending on the reaction conditions involved. The present invention was accomplished based on such findings.

SUMMARY OF THE INVENTION

The present invention was completed based on studies carried out with the view to overcome the problems of the three processes described in the foregoing.

Thus, an object of the present invention is to efficiently reduce NOx to nitrogen in an oxidizing atmosphere from exhaust gases discharged from various plants and equipment, including diesel engines and the like.

The present invention provides, accordingly, a process characterized in that it comprises:

bringing the NOx-containing exhaust gas into contact with at least one catalyst selected from the group consisting of proton-type zeolites, alkali metal exchanged form zeolites, and acidic metal oxides, in an oxidizing atmosphere containing excess oxygen by reaction with a hydrocarbon or an oxygen-containing organic compound.

The present invention further provides a process which comprises:

first bringing the NOx-containing exhaust gas into contact with at least one catalyst selected from the group consisting of proton-type zeolites, alkali metal exchanged form zeolites, and acidic metal oxides, in an oxidizing atmosphere containing excess oxygen by reaction with a hydrocarbon or an oxygen-containing organic compound; and then bringing the exhaust gas into contact with an oxidizing catalyst.

DETAILED DESCRIPTION OF THE INVENTION

The process according to the present invention is now described in further detail.

The catalyst used in the present invention is at least one member selected from the group consisting of proton-type zeolites, alkali metal exchanged form zeolites, and acidic metal oxides such as alumina (aluminum oxide) and silica-alumina. Conventionally, the use of such catalysts has not been considered because it was believed to be unlikely that catalytic reduction of NOx would occur at high efficiency using a catalyst system which contained no transition metal species. That is, in an oxidation-reduction reaction, metal oxides having acid sites (e.g., silica-alumina) or zeolites containing no transition metal species were generally believed to lack sufficient activity.

The work carried out by the present inventors, however, resulted in an unexpected effect. That is, even though catalysts containing no transition metal species were used, not only was NOx reduced at high efficiency but a drop in catalyst activity ascribed to reaction with sulfur oxides was avoided. The effect provided by adding a metal such as copper was further in conflict with prior beliefs, since, contrary to the inventors' assumption, the addition of such a metal impaired the catalyst activity.

The zeolites for use in the present invention specifically include, pentasil-type zeolites, mordenites, zeolites Y, zeolites X, zeolites L and silicalites.

There is no particular restriction on the Si/Al ratio ($SiO_2/Al_2O_3$ ratio by formula weight, molar ratio) of the zeolites used in the present invention, but it is preferred to use those having an Si/Al ratio in the range of from about 5 to about 200, more preferably, from about 10 to about 100, from the viewpoint of having higher stability against heat and moisture.

The zeolites mentioned above may be produced by conventional processes, for example, by hydrothermal synthesis using a mixture of a silica source (e.g., silica, silica sol or sodium silicate), an alumina source (e.g., alumina gel, alumina sol or sodium aluminate), an alkali metal source (e.g., sodium hydroxide or sodium silicate), and water as starting materials. The starting mixture may further contain, if necessary, an organic base such as an amine. The product obtained by the hydrothermal synthesis is then separated, washed with water, and dried to obtain a zeolite containing an alkali metal.

To obtain a sodium exchanged zeolite form, an ion exchange treatment should be further carried out on the synthesized zeolite.

A proton-type zeolite can then be obtained from an alkali metal exchanged form zeolite by first preparing an ammonium ion exchanged zeolite by reacting an aqueous solution of ammonium chloride or ammonium nitrate with a zeolite containing an alkali metal, and then calcining the resulting ammonium ion exchanged form zeolite in the temperature range of from about 400 to about 700° C.

The use of such a proton-type zeolite permits efficient decomposition removal of NOx components.

In the process according to the present invention, acidic metal oxides may also be used as the catalyst. Metal oxides, for example, alumina ($Al_2O_3$), titanium oxide ($TiO_2$), and zirconium oxide ($ZrO_2$), as well as complex oxides for example, silica-alumina ($SiO_2 \cdot Al_2O_3$), silica-magnesia ($SiO_2 \cdot MgO$), silica-zirconia ($SiO_2 \cdot ZrO_2$), and alumina-titania ($TiO_2 \cdot Al_2O_3$), are examples of such acidic metal oxides.

There may also be used solids containing three or more metal oxide components so long as they have acidity as a whole, and particularly preferred are those highly acidic, with the acidity being well distributed.

The metal oxides and the like above discussed not only can be used in admixture with the zeolites, but also may be used alone. The metal oxides and the like which are used alone are practically advantageous since they may be readily obtained by a simple synthetic process, that is, by calcining metal hydroxides such as titanium hydroxide and zirconium hydroxide in the temperature range of from about 400 to about 700° C.

The metal oxides may be further treated with a compound containing a sulfate group ($SO_4^{2-}$), which exhibits further improved efficiency in the catalytic reduction of NOx into elemental nitrogen as compared with non-treated metal oxides. As specific examples of compounds containing the sulfate group, there can be mentioned sulfuric acid and ammonium sulfate, and further included are compounds which produce sulfate groups on metal oxides when the treated products are dried and calcined after the treatment.

The metal oxide catalysts which are treated with a compound containing sulfate groups, i.e., sulfuric acid for example, are produced by first bringing metal oxides (e.g., alumina, titanium oxide, zirconium oxide, silica-alumina, silica–magnesia, silica-zirconia or alumina-titania) into contact at room temperature with sulfuric acid having a predetermined concentration, and then calcining the dried product obtained therefrom in air at a predetermined temperature. A catalyst having higher activity can be obtained, however, by subjecting an amorphous oxide or a corresponding hydroxide to the same treatment.

The concentration of the sulfuric acid used in the treatment differs according to the oxide with which the acid is to be impregnated, but, in general, it is in the range of from about 0.01 to about 10 mole/l, and, more preferably, in the range of from about 0.1 to about 5 mole/l. The sulfuric acid is brought into contact with the metal oxide in a weight amount of from about 5 to about 20 times the weight amount of the metal oxide (catalyst).

If the concentration of the sulfuric acid is less than about 0.01 mole/l, the effect of the sulfuric acid on the activation of NOx reduction is not fully exhibited; if the concentration exceeds about 10 mole/l, unfavorable results such as the destruction of the catalyst structure and the formation of metal sulfates are apt to occur, which are not preferred.

Ammonium sulfate may be used in place of sulfuric acid as the compound having a sulfate group, in a similar manner as above.

Calcination in air is conducted, in general, though dependent on the type of the oxide, in the temperature range of about 300 to about 850° C., and preferably from about 400 to about 700° C., and in the time range of about 2 to about 5 hours.

If the calcination in air is carried out at a temperature of lower than 300° C., the compounds such as sulfuric acid utilized in the treatment are not fully removed such that active catalytic sites are not sufficiently produced; if the temperature for the calcination in air exceeds 850° C., there may occur unfavorable results such as a reduction in surface area of the catalyst or the destruction of active catalyst sites.

In another embodiment according to the process of the present invention, the exhaust gas may be further brought into contact with an oxidizing catalyst downstream of the first catalyst above discussed. The oxidizing catalysts for use include those comprising a porous support or carrier made of, for example, active alumina, silica or zirconia, which carry catalyst components such as noble metals (e.g., platinum, palladium, rhodium, ruthenium or iridium), base metals (e.g., lanthanum, cerium, copper or iron), and perovskite oxides (e.g., cobalt lanthanum trioxide, iron lanthanum trioxide or cobalt strontium trioxide). The catalyst components mentioned above are either used singly or as a combination of two or more thereof.

The catalyst component in this case is carried in an amount of from about 0.01 to about 2% by porous support or carrier weight if it is a noble metal, while it is carried in an amount of from about 5 to 70% by porous support or carrier weight if it is a base metal.

In using a noble metal catalyst or a base metal catalyst, if the amount of the catalyst component carried in the carrier is less than the lower limits mentioned above, the sufficient effect of using them as an oxidizing catalyst cannot be expected. If the catalysts are used in an amount exceeding the upper limits, on the other hand, the degree of improvement as compared with the amount of addition is not as high as expected.

The proportion of the reducing catalyst to the oxidizing catalyst, as well as the amount of the catalyst component carried on the oxidizing catalyst can be properly selected according to the performance required of the catalyst system. Particularly, when the substance to be removed by oxidation is an intermediate such as carbon monoxide produced during the oxidation of a hydrocarbon, there may be used a mixture of a reducing catalyst and an oxidizing catalyst. In general, however, the catalysts are used in such an arrangement in which the reducing catalyst is first contacted with the exhaust gas and then the oxidizing catalyst is contacted with the exhaust gas.

In the practical use of such catalysts, for example, a reactor charged with a reducing catalyst is set at the exhaust gas inlet side (primary stage) with another reactor charged with an oxidizing catalyst set at the exhaust gas discharge side (secondary stage). It is also possible to use a single reactor charged with a reducing catalyst and an oxidizing catalyst at a proportion determined according to the required performance.

The (A) reducing catalysts and the (B) oxidizing catalysts are used, in terms of (A)/(B) weight ratio, in the range of from approximately 0.5/9.5 to about 9.5/0.5.

There is no particular restriction on the shape or the structure of the above catalysts, and they may be used as a powder, granules, pellets, honey-combs and the like.

Additives such as binders which are intended for imparting moldability to the catalysts, for example, non-acidic oxides including silica, silica sol, carbon wax, as well as fats and oils, may also be incorporated in admixture with the active catalyst components.

The process according to the present invention is intended for NOx abatement of exhaust gases discharged from diesel engines of diesel engine automobiles, stationary diesel engines and the like, as well as for the treatment of exhaust gases discharged from gasoline fueled engines such as gasoline fueled automobiles. It is also intended to be used for treating exhaust gases discharged from plants manufacturing nitric acid, various types of combustion installations, and the like.

The NOx components are removed from the exhaust gases above by bringing the catalysts set forth above into contact with the exhaust gas in an oxidizing atmosphere, by reaction with a hydrocarbon or an oxygen-containing organic compound.

The oxidizing atmosphere referred to herein signifies an atmosphere containing an excess amount of oxygen with respect to the amount required to effect complete oxidation of the components of the exhaust gas (i.e., carbon monoxide, hydrogen, hydrocarbons, and oxygen-containing compounds) and of the optionally used reducing substance for the hydrocarbons or oxygen-containing organic compounds, to yield water and carbon dioxide. There can be mentioned, in the case of a combustion engine such as in an automobile, for example, an atmosphere having an excess air ratio (lean region), which commonly has an excess oxygen ratio of from about 20 to about 200%.

In an oxidizing atmosphere as defined above, the NOx is predominantly reduced, since the catalyst (which is first contacted with or upstream of the exhaust gas flow) selectively promotes the reaction of the hydrocarbons or oxygen-containing organic compounds with NOx over that of the hydrocarbons or oxygen-containing organic compounds with oxygen.

The hydrocarbons or oxygen-containing organic compounds which are present may be residual hydrocarbon or oxygen-containing organic compound which have remained in the exhaust gas, but if the residual hydrocarbon or oxygen-containing organic compound present is too low with respect to the amount required to promote the reaction between the hydrocarbon or oxygen-containing organic compound and the NOx, a compensatory amount of hydrocarbon or oxygen-containing organic compound should be additionally supplied.

There is no particular restriction with respect to the amount of the hydrocarbon or oxygen-containing organic compound present, but it is preferred that there be excess hydrocarbon or oxygen-containing organic compound in the reaction system, since the reduction reaction more favorably proceeds by reaction with excess hydrocarbon or oxygen-containing organic compound with respect to the amount strictly or stoichiometrically necessary for the reduction of NOx. In general, the hydrocarbon or oxygen-containing organic compound is used in an amount about 20 to about 2,000% excess, more preferably, from about 30% to about 1,500% excess, with respect to the theoretical or stoichiometrical amount of the hydrocarbon or oxygen-containing organic compound necessary for the reduction decomposition of the NOx.

The theoretical amount of hydrocarbon or oxygen-containing organic compound necessary for the reduction decomposition of the NOx is defined herein as the amount of hydrocarbon or oxygen-containing organic compound necessary for reducing nitrogen dioxide ($NO_2$) into nitrogen. Since there is oxygen present in the reaction system, it is assumed that the oxygen finally oxidizes all NOx present into nitrogen dioxide. To this end, for example, in the case of reducing 1000 ppm of nitric oxide (NO) in the presence of oxygen using propane as the hydrocarbon, the theoretical amount of propane necessary in the system is 200 ppm.

In general, the hydrocarbon necessary in the system is in the range of from about 50 ppm to about 10,000 ppm, in terms of methane, though it depends on the amount of the NOx present in the exhaust gas.

There is no particular restriction with respect to the hydrocarbon or oxygen-containing organic compound used in the process according to the present invention, and there may be used any type of hydrocarbon or oxygen-containing organic compound including gaseous hydrocarbons or oxygen-containing organic compounds and liquid hydrocarbons or oxygen-containing organic compounds, so far as the hydrocarbon or oxygen-containing organic compound is gaseous at the reaction temperature.

As specific gaseous hydrocarbons, examples are methane, ethane, propane, butane, ethylene, propylene, and butylene; as liquid hydrocarbons, included are petroleum based hydrocarbons such as gasoline, kerosene, gas oil and heavy oil, as well as oxygen-containing organic compounds such as alcohols (e.g., methanol or ethanol), ethers (e.g., dimethyl ether, ethyl ether or propyl ether), esters (e.g., methyl acetate or ethyl acetate), and ketones (e.g., acetone or methyl ethyl ketone).

The reaction is carried out by passing the NOx-containing exhaust gas through a reaction vessel containing the zeolites or the metal oxides earlier discussed, in an oxidizing atmosphere and in the. presence of at least one hydrocarbon or oxygen-containing organic compound.

There may be cases, depending on the reaction conditions, in which toxic components such as carbon monoxide are discharged from the reaction vessel. In such a case, the exhaust gas passed through the reaction vessel (the first reaction vessel) is continuously introduced into a second reaction vessel charged with an oxidizing catalyst, which is provided downstream from the first reaction vessel. With such an arrangement, it is possible to reduce the NOx component and then remove hydrocarbons or oxygen-containing compounds as well as toxic components, such as carbon monoxide, by oxidation.

The optimum temperature for the reaction differs depending on the type of the catalyst and the hydrocarbon or oxygen-containing organic compound. It is preferred, however, that the temperature is as close as possible to that of the exhaust gas temperature, since in such a case there is no need to install any heating means or the like to adjust the temperature. Thus, it is preferred that the reaction temperature be in the range of from about 200 to about 800° C., and particularly preferred is a temperature from about 300 to about 600° C.

The reaction is carried out under normal exhaust pressure, since there is no particular restriction with respect to the pressure conditions. The hourly space velocity, SV, at which the exhaust gas is introduced into the catalyst layer varies depending on reaction conditions such as the reaction temperature as well as the required rate of removal of the NOx and the toxic components. Though the SV is not particularly limited, it is generally in the range of from about 500 to about 100,000 $hr^{-1}$, and preferably, in the range of from about 1,000 to about 70,000 $hr^{-1}$.

In the case of applying the process according to the present invention to the treatment of exhaust gas discharged from an internal combustion engine, the catalysts according to the present invention preferably is downstream of the exhaust manifold of the engine.

It can be seen from the foregoing that the process according to the present invention not only efficiently reduces the NOx components to nitrogen from the exhaust gas in an oxidizing atmosphere with excess oxygen, but that it effectively prevents the discharge of toxic components such as carbon monoxide. Such an effect has been realized by the use of a proton-type zeolite or a zeolite containing an alkali metal, or by the use of an acidic metal oxide by reaction with a hydrocarbon or oxygen-containing organic compound, thereby preferentially accelerating the reaction of NOx with the hydrocarbon or oxygen-containing organic compound. Further, the use of an oxidizing catalyst enables complete oxidation of any non-reacted hydrocarbon or oxygen-containing organic compounds present as well as intermediate oxidized products which can include carbon monoxide, and converts them into carbon dioxide and water vapor. Such non-reacted hydrocarbons or oxygen-containing organic compounds and intermediate oxidized products have been a problem in some cases, since they were likely to be discharged to the atmosphere, depending on the reacting conditions.

The process according to the present invention is, therefore, of high practical value in industry, since it not only reduces NOx components to nitrogen effectively from exhaust gases discharged from various sources including diesel engines and the like, but also effectively avoids discharge of toxic components to the atmosphere.

The invention is explained in further detail below making reference to Examples and Comparative Examples, but it should be understood that the present invention is not to be construed as being limited thereto. In the following, all parts and percents are by weight except gaseousness.

EXAMPLE 1

Preparation of pentasil-type zeolite

In an aqueous solution obtained by dissolving 957 g of sodium silicate into 1,200 g of water there was gradually added (with stirring over 30 minutes) an aqueous solution prepared by dissolving 41 g of aluminum sulfate, 80 g of conc. sulfuric acid and 360 g of sodium chloride into 1,600 g of water. To the resulting solution was then further added 120 g of ammonium tetrapropyl bromide to adjust the pH to 10.

The mixed solution was charged into an autoclave while maintaining the temperature of the contents at 165° C. while stirring over 16 hours, to obtain a crystallized product. The crystals thus obtained were separated, washed with water, and dried to obtain a pentasil-type ZSM-5 zeolite having an $SiO_2/Al_2O_3$ ratio of 62.7. This zeolite was used as the starting material in the subsequent examples.

Preparation of a proton-type pentasil-type zeolite

Into 500 ml of a solution containing 1 mole/l of ammonium nitrate solution was charged 20 g of the pentasil-type zeolite prepared above, and after stirring and refluxing for one whole day, the solution was subjected to centrifugal separation.

After washing the zeolite thus separated five times with pure water and drying overnight at 110° C., it was calcined in air at 500° C. for 3 hours to obtain a proton-type ZSM-5 zeolite.

Reduction of NOx

One gram of the proton-type zeolite catalyst thus prepared above was charged into a normal pressure flow type reaction apparatus, to which was introduced a mixed gas at a flow rate of 60 ml/minute to effect reaction. The gas mixture comprised helium gas carrying 1,000 ppm nitric oxide (hereinafter referred to as "NO"), 10% oxygen, and 300 ppm propylene (a space velocity of about 2,000 $hr^{-1}$). The helium gas was used to ensure analyzing $N_2$ produced on reaction.

The gas obtained after the reaction was analyzed by means of an NOx analyzer and a gas chromatograph.

The catalytic reduction ratio of the NO into nitrogen (percentage conversion of NO to $N_2$) was obtained from the yield of the nitrogen produced on reaction, and the results are given in Table 1 as Example 1. The formula used to calculate the catalytic reduction ratio is as below:

$$\frac{N_2 \text{ formed (in mole)} \times 2}{NO_x \text{ introduced into reactor (in mole)}} \times 100$$

EXAMPLE 2

The catalytic reduction ratio of NO was determined in the same manner as in Example 1, except for using propane as the hydrocarbon. The results are given in Table 1 as Example 2.

EXAMPLE 3

Preparation of proton-type mordenite

Into 500 ml of a solution containing 1 mole/l of ammonium nitrate solution was charged 20 g of a commercially available sodium-form mordenite having an SiO$_2$/Al$_2$O$_3$ ratio of 20.1. After stirring and refluxing for one whole day, the solution was subjected to centrifugal separation.

After washing the zeolite thus separated five times with pure water and then drying overnight at 110° C., it was calcined in air at 500° C. for 3 hours to obtain a proton-type mordenite.

Reduction of NOx

The catalytic reduction ratio of NO was determined in the same manner as in Example 1 using the thus prepared proton-type mordenite, except for using propane as the hydrocarbon. The results are given in Table 1 as Example 3.

EXAMPLE 4

The catalytic reduction ratio of NO was determined in the same manner as in Example 1 except for using as the zeolite a commercially available proton-type stabilized Y-zeolite having an SiO$_2$/Al$_2$O$_3$ ratio of 49.7. The results are given in Table 1 as Example 4.

EXAMPLE 5

The catalytic reduction ratio of NO was determined in the same manner as in Example 1 except for using as the zeolite a silicalite, i.e., a pentasil-type zeolite containing no aluminum, and using propane as the hydrocarbon. The results are given in Table 1 as Example 5.

EXAMPLE 6

Preparation of Na-zeolite

Into 500 ml of a solution containing 1 mole/l of sodium nitrate solution was charged the base zeolite ZSM-5 prepared in the same manner as in Example 1. After stirring and refluxing with heating for one whole day the solution was subjected to centrifugal separation.

After washing the zeolite thus separated five times with pure water, it was dried overnight at 110° C. to obtain a Na exchanged form ZSM-5 zeolite.

Reduction of NOx

The catalytic reduction ratio of NO was determined in the same manner as in Example 1 except for using the thus prepared Na-form ZSM-5 zeolite. The results are given in Table 1 as Example 6.

COMPARATIVE EXAMPLE 1

Preparation of copper-carrying zeolite

A 0.05 mole/l solution of commercially available copper acetate was prepared. The base zeolite ZSM-5 prepared in the same manner as in Example 1 was then charged thereinto. After stirring and refluxing with heating the resulting mixture for one whole day, the solution was subjected to centrifugal separation.

The process was repeated thrice, and after finally washing the resulting zeolite five times with pure water, it was dried overnight at 110° C. to obtain a copper-bearing zeolite.

Reduction of NOx

The catalytic reduction ratio of NO was determined in the same manner as in Example 1 except for using the thus prepared copper-bearing zeolite and using propane as the hydrocarbon. The results are given in Table 1 as Comparative Example 1.

As is clear from Table 1, the effectiveness of the zeolites containing no metal is clearly shown since the catalytic reduction ratio of NO of the copper-bearing zeolite is inferior to the other Examples.

EXAMPLE 7

The catalytic reduction ratio of NO was determined in the same manner as in Example 1 except for using a proton-type ZSM-5 (H-ZSM-5) treated at 500° C. for 6 hours in a mixed gas comprising 900 ppm of sulfur dioxide and 5% oxygen, and using propane as the hydrocarbon. The results are given in Table 1 as Example 7.

It can be seen from the Table that the present catalyst is completely free from being poisoned by the SOx, since the catalytic reduction ratio remained the similar to that of the catalyst prepared in Example 2.

TABLE 1

(Catalytic reduction of NO into N$_2$ using a zeolite catalyst)

| | Catalyst | Hydrocarbon | Reaction temperature (°C.) | Catalytic redn. ratio of NO to N$_2$ (%) |
|---|---|---|---|---|
| Ex.1 | H-ZSM-5 | propylene | 600 | 8.5 |
| | | | 500 | 14 |
| | | | 400 | 27 |
| | | | 300 | 51 |
| | | | 250 | 51 |
| Ex.2 | H-ZSM-5 | propane | 600 | 24 |
| | | | 500 | 38, 63* |
| | | | 400 | 59, 84* |
| | | | 300 | 49 |
| Ex.3 | H-mordenite | propane | 600 | 32 |
| | | | 500 | 48 |
| | | | 400 | 65 |
| | | | 300 | 58 |
| Ex.4 | H-Y | propylene | 300 | 36 |
| Ex.5 | Silicalite | propane | 400 | 22 |
| Ex.6 | Na-ZSM-5 | propylene | 400 | 14 |
| | | | 300 | 32 |
| | | | 200 | 20 |
| Comp. Ex.1 | Cu-ZSM-5 | propane | 500 | 9.1 |
| | | | 400 | 8.5 |
| | | | 300 | 8.3 |
| Ex.7 | H-ZSM-5 (SOx) | propane | 500 | 40 |
| | | | 400 | 55 |

*The amount of hydrocarbon addition was 900 ppm.

EXAMPLES 8 AND 9

The catalytic reduction ratio of NO was determined in the same manner as in Example 1 except for using alumina powder having a specific surface area of 400 m²/g and pelletized γ-alumina as the catalysts, and using propane as the hydrocarbon. The results are given in Table 2 as Examples 8 and 9.

EXAMPLE 10

The catalytic reduction ratio of NO was determined in the same manner as in Example 1 except for using commercially available silica-alumina (containing 61% alumina) as the catalyst. The results are given in Table 2 as Example 10.

EXAMPLE 11

Commercially available zirconium hydroxide was calcined in an air flow at 400° C. for 3 hours to synthesize zirconium oxide. The catalytic reduction ratio of NO was determined in the same manner as in Example 1 except for using the thus prepared zirconium oxide as the catalyst. The results are given in Table 2 as Example 11.

EXAMPLE 12

In 1 L of water was dissolved 300 g of aluminum sulfate [$Al_2(SO_4)_3 \cdot (16-18)H_2O$], and to the resulting solution was first dropwise added 75 g of 24% titanium sulfate solution with stirring, followed by dropwise adding 14% aqueous ammonia until the pH became 9. The product thus obtained was ripened for several hours in a water bath kept at 95° C., and the resulting product was filtered, washed with water until no sulfate group was detectable, dried, and calcined in air at 500° C. for 3 hours to obtain alumina-titania ($Al_2O_3 \cdot TiO_2$) containing 10% of titanium oxide.

The alumina-titania thus prepared was charged in a normal pressure flow type reaction apparatus as in Example 1, into which was then introduced a mixed gas at a rate of 60 ml per minute to carry out reaction. The catalytic reduction of NO was then determined in the same manner as in Example 1. In this case, the gas mixture comprised helium gas carrying thereon 2,000 ppm NO, 10% oxygen and 600 ppm propylene. The results are given in Table 2 as Example 12.

COMPARATIVE EXAMPLE 2

The catalytic reduction ratio of NO was determined in the same manner as in Example 1 except for using commercially available silica gel as the catalyst. The results are given in Table 2 as Comparative Example 2.

It is apparent from Table 2 that a silica gel, which has no surface acidity, has no activity for catalytic reduction despite its high surface area.

COMPARATIVE EXAMPLE 3

The catalytic reduction ratio of NO was determined in the same manner as in Example 1 except for using commercially available α-alumina as the catalyst. The results are given in Table 2 as Comparative Example 3.

It is apparent from Table 2 that an α-alumina, which has no surface acidity and an extremely small specific surface area, has no activity for catalytic reduction.

TABLE 2

(Catalytic reduction of NO into nitrogen using a metal oxide)

| | Catalyst | Form | Reaction temperature (°C.) | Catalytic reduction ratio of NO into $N_2$ (%) |
|---|---|---|---|---|
| Ex. 8 | Alumina (400 m²/g) | powder | 600 | 49 |
| | | | 500 | 68 |
| | | | 400 | 30 |
| Ex. 9 | γ-Alumina | pellets | 600 | 18 |
| | | | 500 | 37 |
| | | | 400 | 14 |
| | | | 300 | 1.8 |
| Ex.10 | Silica-alumina (61% alumina) | powder | 600 | 12 |
| | | | 500 | 14 |
| | | | 400 | 4.9 |
| Ex.11 | Zirconium oxide | powder | 600 | 9.1 |
| | | | 500 | 20 |
| | | | 400 | 23 |
| Ex.12 | Alumina-titania (10% Ti oxide) | powder | 400 | 36 |
| | | | 300 | 35 |
| Comp. Ex. 2 | Silica gel | powder | 600 | ≦1.0 |
| | | | 500 | ≦1.0 |
| | | | 400 | ≦0.6 |
| | | | 300 | ≦0.4 |
| Comp. Ex. 3 | α-Alumina | pellets | 700 | ≦1.4 |
| | | | 600 | ≦0.8 |
| | | | 500 | ≦0.7 |
| | | | 400 | ≦0.8 |

EXAMPLE 13

The catalytic reduction ratio of NO was determined in the same manner as in Example 1 except for using alumina powder having a specific surface area of 285 m²/g as the catalyst and using propane as the hydrocarbon. The amount of the hydrocarbon added was varied. The results obtained by varying the addition amount of the hydrocarbon are given in Table 3 as Example 13.

The results show that the catalytic reduction ratio of NO increases with increasing the amount of hydrocarbon.

TABLE 3

(Catalytic reduction of NO using a metal oxide)

| | Catalyst | Reaction Temp. (°C.) | Reduction ratio of NO into $N_2$ (%) Propane added (ppm) | | | |
|---|---|---|---|---|---|---|
| | | | 300 | 600 | 1000 | 1300 |
| Ex.13 | Alumina powder (285cm²/g) | 500 | 36 | 67 | 89 | 97 |
| | | 600 | 18 | 37 | 54 | — |

EXAMPLE 14

The catalytic reduction ratio of NO was determined in the same manner as in Example 1 except for using 0.1 g of the same alumina powder as was used in Example 8. The alumina as a catalyst had a specific surface area of 400 m²/g. Propane was used as the hydrocarbon. The amount of the propane was varied. The results obtained by varying the propane amount are given in Table 4 as Example 14.

The results show that a high catalytic reduction ratio of NOx is obtained even in a reaction performed at a high space velocity of about 20,000 hr⁻¹.

TABLE 4

(Catalytic reduction of NO using a metal oxide)

| | Catalyst | Reaction Temp. (°C.) | Reduction ratio of NO into $N_2$ (%) Propane added (ppm) | | | | |
|---|---|---|---|---|---|---|---|
| | | | 300 | 600 | 1000 | 1900 | 2600 |
| Ex.14 | Alumina powder (400cm²/g) | 600 | 24 | 46 | 75 | 90 | 94 |

EXAMPLE 15 AND 16

The catalytic reduction ratio of NO was determined in the same manner as in Example 1 except for using 1 g each of the same H-ZSM-5 as was used in Example 1 and the same alumina powder having a specific surface area of 285 m²/g as was used in Example 13 as catalysts, and using propane as the hydrocarbon while changing the concentration of the accompanying oxygen. The results are given in Table 5 as Examples 15 and 16.

The results show that a high catalytic reduction ratio of NO is obtained over a wide concentration range of the accompanying oxygen.

TABLE 5

(Catalytic reduction of NO under various oxygen concentrations)

| | Catalyst | Reaction Temperature (°C.) | Reduction ratio of NO into $N_2$ (%) Oxygen concentration (%) | | | |
|---|---|---|---|---|---|---|
| | | | 0.2 | 1 | 5 | 10 |
| Ex.15 | H-ZSM-5 powder | 400 | | 53 | 55 | 52 |
| | | 500 | | 44 | 37 | 35 |
| Ex.16 | Alumina powder (285cm²/g) | 500 | 6 | 15 | | 32 |
| | | 600 | 21 | 33 | | 17 |

EXAMPLE 17

To 1 l of distilled water in a beaker there was gradually added 200 ml of commercially available titanium isopropoxide (while stirring) to thereby obtain a precipitate. To the resulting mixture there was carefully added 170 ml of conc. nitric acid care to dissolve the precipitate. There was then dropwise added thereto 25% aqueous ammonia to control the pH value to 8, to thereby obtain the precipitate once again. The product thus obtained was allowed to stand for one whole day and was then filtered, washed with water and dried to obtain titanium hydroxide.

Ten grams of the titanium hydroxide thus prepared was taken on a filter paper and air dried after applying thereto 150 ml of 0.5 mole/l sulfuric acid. The dried titanium hydroxide was calcined in an air flow at 530° C. for 3 hours to obtain a sulfuric acid treated titanium oxide catalyst.

Reduction of NOx

The catalytic reduction ratio of NO was determined in the same manner as in Example 1 except for using the thus prepared sulfuric acid treated titanium oxide catalyst and using propane as the hydrocarbon. In this case, 1 g of the above catalyst was charged in a normal pressure flow type fixed bed reaction apparatus into which was introduced a mixed gas at a rate of 60 ml per minute to carry out the reaction at various temperatures as are given in Table 6 and to determine the catalytic reduction of NO in the same manner as in Example 1. The gas mixture comprised helium gas carrying thereon 1,000 ppm NO, 10% oxygen, and 300 ppm propane. The reaction gas was analyzed in the same manner as in Example 1. The results are given in Table 6 as Example 17.

EXAMPLE 18

Commercially available zirconium hydroxide was calcined at 400° C. and 10 g of the calcined product was taken on a filter paper, to which was applied 150 ml of 0.5 mole/l sulfuric acid. The product was then air dried. The dried titanium hydroxide was calcined in an air flow at 600° C. for 3 hours to obtain a sulfuric acid treated zirconium oxide catalyst.

The catalytic reduction ratio of NO was determined in the same manner as in Example 17 except for using the thus obtained sulfuric acid treated zirconium oxide catalyst as the catalyst and replacing propane with diethyl ether in an amount of about 300 ppm by weight as to propane. The results are given in Table 6 as Example 18.

EXAMPLE 19

In 200 ml of distilled water there was dissolved 50 g of a commercially available ferric nitrate [$Fe(NO_3)_3$], into which was further added, while stirring, 34 ml of 25% aqueous ammonia to control the pH value to 8, to thereby obtain a precipitate. The product thus obtained was then filtered, washed with water, and dried to obtain amorphous iron oxide.

Four grams of the iron oxide thus prepared was taken on a filter paper and then air dried after applying thereto 60 ml of 0.25 mole/l sulfuric acid. The dried iron oxide was finally calcined in an air flow at 500° C. for 3 hours to obtain a sulfuric acid treated iron oxide catalyst.

The catalytic reduction ratio of NO was determined in the same manner as in Example 17 except for using the thus obtained sulfuric acid treated iron oxide catalyst as the catalyst. The results are given in Table 6 as Example 19.

EXAMPLE 20

Four grams of commercially available FCC alumina was taken on a filter paper, and was then air dried after applying thereto 60 ml of 0.25 mole/l sulfuric acid. The thus obtained dried alumina was calcined in an air flow at 600° C. for 3 hours to obtain a sulfuric acid treated alumina catalyst.

The catalytic reduction ratio of NO was determined in the same manner as in Example 17 except for using the thus obtained sulfuric acid treated alumina catalyst as the catalyst. The results are given in Table 6 as Example 20.

Each of Examples 17 to 20 illustrates the case where a metal oxide treated with sulfuric acid was used as the catalyst.

TABLE 6

(Catalytic reduction of NO using a sulfuric acid treated metal oxide catalysts)

| | Catalyst | Reaction temperature (°C.) | Catalytic reduction ratio of NO into $N_2$ (%) |
|---|---|---|---|
| Ex.17 | sulfuric acid treated Ti oxide | 500 | 28 |
| | | 400 | 47 |
| | | 300 | 27 |
| | | 200 | 6.4 |
| Ex.18 | sulfuric acid | 600 | 24 |
| | | 500 | 33 |

TABLE 6-continued (Catalytic reduction of NO using a sulfuric acid treated metal oxide catalysts)

| | Catalyst | Reaction temperature (°C.) | Catalytic reduction ratio of NO into N₂ (%) |
|---|---|---|---|
| | treated | 400 | 22 |
| | Zr oxide | 300 | 11 |
| Ex.19 | sulfuric acid treated | 500 | 1.2 |
| | | 400 | 7.3 |
| | | 300 | 13 |
| | Fe oxide | 200 | 0.8 |
| Ex.20 | sulfuric acid treated alumina | 300 | 6.3 |

EXAMPLE 21

_Reduction of NOx_

One gram of the same proton-type ZSM-5 zeolite catalyst as was prepared in Example 1 above was charged together with 1 g of 0.5% Pt on alumina into a normal pressure flow fixed bed type reaction apparatus, arranged in such a manner that the H-ZSM-5 was first (up stream) and the Pt on alumina was second (down stream). There was then introduced into the reaction apparatus a mixed gas at a flow rate of 60 ml/minute and reaction carried out at various temperatures as shown in Table 7. The gas mixture comprised helium gas, carrying therein 1,000 ppm NO, 10% oxygen and 300 ppm propane.

The gas thus treated was analyzed by means of a gas chromatograph to determine the nitrogen yield, from which the catalytic reduction ratio of NO was obtained.

The ratio of catalytic reduction of NO into nitrogen, the amount of exhaust CO and the amount of propane and $CO_2$ involved in the reaction are given in Table 7 as Example 21.

It can be clearly seen from Table 7 that propane is almost completely oxidized to carbon dioxide with the catalytic reduction of the NOx.

REFERENCE EXAMPLE 1

Catalytic reduction of NO was carried out in the same manner as in Example 21, except for using 1 g of H-ZSM-5 alone without using any Pt on alumina. The results are given in Table 7 as Reference Example 1.

It can be seen from the results that CO is also discharged under the reaction conditions of this Reference Example 1, and that in a reaction at a temperature as low as 300° C., propane is evolved in a considerable amount. This signifies that those components undesired for human health still remain even in the gas after treatment.

TABLE 7

| Catalyst | Reaction temperature (°C.) | Catalytic reduction ratio of NO into N₂ (%) | CO (ppm) | propane (ppm) | CO₂ (ppm) |
|---|---|---|---|---|---|
| Example 21 | | | | | |
| H-ZSM-5 and Pt/Al₂O₃ | 500 | 41 | 0 | 0 | 941 |
| | 400 | 59 | 0 | 0 | 941 |
| | 300 | 48 | 0 | 0 | 945 |
| Reference Example 1 | | | | | |
| H-ZSM-5 | 500 | 38 | 55 | 0 | 937 |
| | 400 | 59 | 143 | 0 | 846 |
| | 300 | 49 | 123 | 102 | 556 |

EXAMPLE 22

Ten grams of commercially available zirconium hydroxide was taken on a filter paper, an was then air dried after applying thereto 150 ml of 0.5 mole/l sulfuric acid. The dried zirconium hydroxide was then calcined in an air flow at 600° C. for 3 hours to obtain a sulfuric acid treated zirconium oxide catalyst.

One gram of the sulfuric acid treated zirconium oxide thus prepared was charged together with 1 g of 0.5% Pt on alumina in a normal pressure flow fixed bed type reaction apparatus in the same manner as in Example 21. There was then introduced into the apparatus a mixed gas at a flow rate of 60 ml/minute to effect reaction at various temperatures as are shown in Table 8. The gas mixture comprised helium gas, carrying therein 1,000 ppm NO, 10% oxygen and 300 ppm propane.

The catalytic reduction ratio of NO and the analysis of the product gas were performed in the same manner as in Example 21. The results are given in Table 8 as Example 22.

REFERENCE EXAMPLE 2

Catalytic reduction of NO was carried out in the same manner as in Example 21 except for using 1 g of sulfuric acid treated zirconium oxide alone without using any Pt on alumina. The results are given together in Table 8 as Reference Example 2.

TABLE 8

| Catalyst | Reaction temperature (°C.) | Catalytic reduction ratio of NO into N₂ (%) | CO (ppm) | propane (ppm) | CO₂ (ppm) |
|---|---|---|---|---|---|
| Example 22 | | | | | |
| acid-treated Zr oxide and Pt/Al₂O₃ | 500 | 32 | 0 | 0 | 963 |
| | 600 | 25 | 0 | 0 | 895 |
| Reference Example 2 | | | | | |
| acid-treated Zr oxide | 500 | 33 | 53 | 118 | 560 |
| | 600 | 24 | 72 | 0 | 915 |

EXAMPLE 23

Commercially available FCC alumina powder having a specific surface area of 285 m²/g was used as the reducing catalyst for NOx, and a catalyst comprising an alumina carrier carrying therein 30% of ferric oxide was used as the oxidizing catalyst.

The oxidizing catalyst above was prepared by adding (while stirring) 35 g of commercially available γ-alumina into a solution prepared by dissolving 38 g of ferric nitrate hydrate [Fe(NO₃)₃·9H₂O] in 300 ml of distilled water, and then controlling the pH of the solution to a value of 8 by dropwise adding aqueous 14% ammonia thereto to thereby obtain an iron hydroxide precipitate on the alumina. The product obtained by filtering was further washed with water, dried and calcined in air at 500° C. for 3 hours to obtain the oxidizing catalyst.

One gram each of the alumina above and the oxidizing catalyst thus prepared were charged together in a normal pressure flow fixed bed type reaction apparatus in the same manner as in Example 21, there was introduced into the apparatus a mixed gas at a flow rate of 60 ml/minute to carry out reaction at 500° C. The gas mixture comprised helium gas carrying therein 1,000 ppm NO, 10% oxygen and propane. The amount of propane was varied as shown in Table 9.

The catalytic reduction ratio of NO was calculated and the product gas was analyzed in the same manner as in Example 21. The results are given in Table 9 as Example 23.

REFERENCE EXAMPLE 3

The catalytic reduction of NO was carried out in the same manner as in Example 23 except for using 1 g of FCC powder alumina having a specific surface area of 285 $m^2/g$ alone, i e , without using any oxidizing catalyst The results are given in Table 9 as Reference Example 3.

TABLE 9

| Catalyst | Propane added (ppm) | Catalytic reduction ratio of NO into $N_2$ (%) | CO (ppm) | propane (ppm) | $CO_2$ (ppm) |
| --- | --- | --- | --- | --- | --- |
| Example 23 | | | | | |
| Alumina powder and Fe-oxide/$Al_2O_3$ | 300 | 36 | 0 | 0 | 992 |
| | 600 | 66 | 0 | 0 | 1886 |
| | 1000 | 90 | 0 | 0 | 3154 |
| | 1300 | 97 | 0 | 0 | 4054 |
| Reference Example 3 | | | | | |
| Alumina powder | 300 | 37 | 87 | 0 | 843 |
| | 600 | 67 | 95 | 0 | 1878 |
| | 1000 | 89 | 176 | 0 | 2857 |
| | 1300 | 95 | 210 | 0 | 2794 |

EXAMPLE 24

To 1 l of water having dissolved therein 300 g of aluminum sulfate hydrate [$Al_2(SO_4)_3 \cdot (16-18H_2O)$] there was dropwise added (while stirring) 75 g of a 24% titanium sulfate solution, and to the resulting solution was further dropwise added aqueous 14% ammonia to control the pH value to 9.

The product thus obtained was ripened using a water bath maintained at 95° C. for several hours and then filtered, thoroughly washed with water until no sulfate group was detected, dried, and calcined in air at 500° C. for 3 hours to obtain an alumina-titania ($Al_2O_3 \cdot TiO_2$) catalyst containing 10% of Ti oxide.

One gram each of the alumina-titania above and a commercially available 0.5% Pd on alumina catalyst were charged together in a normal pressure flow fixed bed type reaction apparatus in the same manner as in Example 21. There was then introduced into the apparatus a mixed gas at a flow rate of 60 ml/minute to carry out reaction at various temperatures as are given in Table 10. The gas mixture comprised helium gas, carrying therein 1,000 ppm NO, 10% oxygen and 600 ppm propylene.

The catalytic reduction ratio of NO and the analysis of the product gas were performed in the same manner as in Example 21. The results are given in Table 10 as Example 24.

REFERENCE EXAMPLE 4

The catalytic reduction of NO was carried out in the same manner as in Example 24 except for using 1 g of alumina-titania alone without using any Pd on alumina catalyst. The results are given together in Table 10 as Reference Example 4.

TABLE 10

| Catalyst | Reaction temperature (°C.) | Catalytic reduction ratio of NO into $N_2$ (%) | CO (ppm) | propane (ppm) | $CO_2$ (ppm) |
| --- | --- | --- | --- | --- | --- |
| Example 24 | | | | | |
| Alumina-titania and Pd/alumina | 300 | 34 | 0 | 0 | 1908 |
| | 400 | 35 | 0 | 0 | 1865 |
| Reference Example 4 | | | | | |
| Alumina-titania | 300 | 35 | 0 | 253 | 1080 |
| | 400 | 36 | 307 | 170 | 983 |

It can be seen from the Examples, Comparative Examples and Reference Examples above that the process according to the present invention enables the efficient catalytic reduction of NOx into nitrogen even in the presence of excess oxygen, without resulting in a drop in catalyst activity due to the presence of sulfur oxides. Thus, the process according to the present invention is very effective in all the aspects as compared with those of the conventional catalysts.

While the invention has been described in detail with reference to specific embodiments thereof, it will be apparent to one skilled in the art that various changes and modifications can be made therein without departing from the spirit and scope thereof.

What is claimed is:

1. A process for reducing nitrogen oxides to nitrogen in exhaust gases, which comprises:

bringing an exhaust gas containing nitrogen oxides into contact with an acidic metal oxide catalyst which consists essentially of alumina, titanium oxide, zirconium oxide, silica-alumina, silica-magnesia, silica-zirconia, or alumina-titania by reaction with a hydrocarbon or an oxygen-containing organic compound in an oxidizing atmosphere containing excess oxygen with respect to the amount of oxygen required to effect complete oxidation of the carbon monoxide, hydrogen, said hydrocarbon and said oxygen-containing organic compound, all of which are present in the exhaust gases, to thereby yield water and carbon dioxide.

2. The process as claimed in claim 1, wherein the catalyst is the acidic metal oxide, wherein the acidic metal oxide is obtained by treating a metal oxide with a compound having a sulfate group.

3. The process as claimed in claim 2, wherein the compound having a sulfate group is sulfuric acid or ammonium sulfate.

4. The process as claimed in claim 2, wherein the metal oxide is treated with a compound having a sulfate group by bringing said metal oxide into contact with sulfuric acid having a concentration of from 0.01 to 10 mole/l, wherein said sulfuric acid is used in an amount by weight of from 5 to 20 times the amount by weight of the metal oxide treated.

5. The process as claimed in claim 2, wherein the acidic metal oxide is treated with a compound containing a sulfate group and the acidic metal oxide is calcined in air at a temperature range of from 300 to 850° C.

6. The process as claimed in claim 1, wherein the process is conducted with a hydrocarbon or an oxygen-containing organic compound at an amount from 20 to 2,000% excess of the theoretical amount necessary for carrying out the catalytic reduction.

7. The process as claimed in claim 6, wherein the hydrocarbon is in the form of a gas or a liquid.

8. The process as claimed in claim 7, wherein the hydrocarbon is in the form of a gas and is methane, ethane, propane, butane, ethylene, propylene or butylene.

9. The process as claimed in claim 7, wherein the hydrocarbon is in the form of a liquid and is gasoline, kerosene, gas oil or heavy oil.

10. The process as claimed in claim 6, wherein the oxygen-containing organic compound is an alcohol, an ether, an ester or a ketone.

11. The process as claimed in claim 1, wherein the reaction temperature is in the range of from 200 to 800° C.

12. The process as claimed in claim 1, wherein the exhaust gas is fed to a layer of the catalyst at a space velocity of from 500 to 100,000 $hr^{-1}$.

* * * * *